US011532403B2

(12) United States Patent
Dina et al.

(10) Patent No.: US 11,532,403 B2
(45) Date of Patent: Dec. 20, 2022

(54) MICROCONTROLLER FOR IOT GAN POWER DEVICES AND MESH NETWORK COMPRISING ONE OR MORE MICROCONTROLLER CONTROLLED IOT GAN DEVICES

(71) Applicant: OPEN PLATFORM SYSTEMS LLC, Garden City, ID (US)

(72) Inventors: Dan Dina, Garden City, ID (US); Robert Deely, Garden City, ID (US); George Lewis, Garden City, ID (US)

(*) Notice: Subject to any disclaimer, the term of this patent is extended or adjusted under 35 U.S.C. 154(b) by 0 days.

(21) Appl. No.: 17/069,840

(22) Filed: Oct. 13, 2020

(65) Prior Publication Data
US 2021/0110935 A1    Apr. 15, 2021

Related U.S. Application Data

(60) Provisional application No. 62/914,323, filed on Oct. 11, 2019, provisional application No. 63/089,457, filed on Oct. 8, 2020.

(51) Int. Cl.
| | |
|---|---|
| *G16Y 40/35* | (2020.01) |
| *G16Y 40/10* | (2020.01) |
| *G16Y 30/00* | (2020.01) |
| *H02J 7/00* | (2006.01) |
| *H04L 67/12* | (2022.01) |
| *G16Y 20/10* | (2020.01) |

(52) U.S. Cl.
CPC .............. *G16Y 40/35* (2020.01); *G16Y 20/10* (2020.01); *G16Y 30/00* (2020.01); *G16Y 40/10* (2020.01); *H02J 7/007* (2013.01); *H02J 7/0063* (2013.01); *H04L 67/12* (2013.01)

(58) Field of Classification Search
CPC ........ G16Y 20/10; G16Y 30/00; G16Y 40/10; G16Y 40/35; H02J 7/0063; H02J 7/007; H04L 67/12
See application file for complete search history.

(56) References Cited

U.S. PATENT DOCUMENTS

| | | | | |
|---|---|---|---|---|
| 2018/0063929 | A1* | 3/2018 | O'Neil | .................. H05B 45/10 |
| 2020/0185930 | A1* | 6/2020 | Kuwata | .................... H02J 7/35 |
| 2020/0341529 | A1* | 10/2020 | Kaipu Narahari | .. G06F 11/3058 |

\* cited by examiner

*Primary Examiner* — Jason D Recek
(74) *Attorney, Agent, or Firm* — Scott D. Swanson; Shaver & Swanson, LLP

(57) ABSTRACT

A microcontroller configured to monitor the input voltage and load conditions, and continuously adjust the switching frequencies in order to optimize the efficiency and longevity of the power supply incorporated in a device. The microcontroller utilizes a combination of GaN switching elements with their efficient high frequency switching capabilities, together with the continuous monitoring of the load conditions, allowing the intelligent microcontroller to vary the switching frequency of the power conversion blocks as needed in order to maintain the highest efficiency of conversion. The microcontroller can be utilized to control a luminaire or other device into which the controller is preferably integrated. The microcontroller can utilize one or more environmental sensors configured for sensing internal environmental conditions and/or external environmental conditions. Preferably the microcontroller utilizes an energy storage device configured to power the microcontroller and associated sensors to allow the mesh network controls to continue functioning in the event of a power outage.

13 Claims, 3 Drawing Sheets

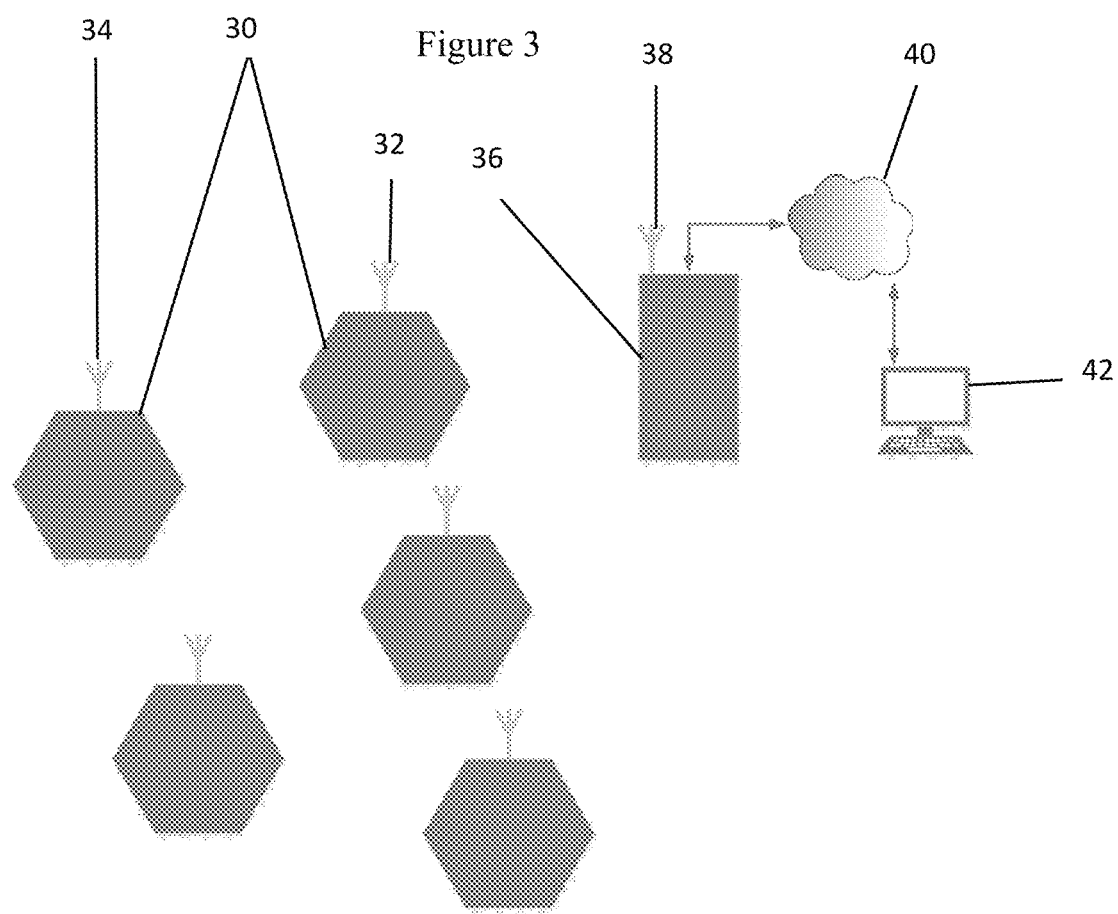

MICROCONTROLLER FOR IOT GAN POWER DEVICES AND MESH NETWORK COMPRISING ONE OR MORE MICROCONTROLLER CONTROLLED IOT GAN DEVICES

PRIORITY/CROSS-REFERENCE TO RELATED APPLICATIONS

This application claims the benefit of U.S. Provisional Application No. 62/914,323, filed Oct. 11, 2019, and U.S. Provisional Application No. 63/089,457, filed Oct. 8, 2020, the disclosure of each of which is incorporated by reference.

TECHNICAL FIELD

The presently disclosed technology relates to the control of Internet of Things (IoT) devices. More particularly, the present invention is a microcontroller for controlling IoT GaN power devices and other IoT devices and sensors, and a mesh network including one or more similar or associated microcontrollers.

BACKGROUND

A typical AC/DC Power Conversion design containing typical elements is illustrated in FIG. 1: Interleaved Boost PFC (Power Factor Correction) stage, a Half Bridge LLC resonant stage and a SR DC voltage output circuit. A Smart LED light driver contains additional control mechanisms that allow it to control the different stages in order to optimize their operations for the given load and input voltage conditions as well as act as a communication device to the outside world.

The availability of GaN (Gallium Nitride) Field Effect Transistors (FETs) has made possible designing a super-efficient Power Supply to be used in the lighting industry and in the control of a variety of systems, such as lighting systems, building control systems, and building operation systems. GaN FETs have the ability to withstand very high VDS voltages (650V) while having very low RDS(on) resistance. This allows a designer to minimize the use of Magnetics and Capacitors in the input stage of a power supply due to the capability of GAN FETs to switch at higher frequencies. Magnetics technology has seen slow and steady advances in the area of material science, with modest improvements in permeability ($\mu$), but the highest improvement comes from physically smaller magnetics due to higher switching frequencies, made possible by GaN FETs. The reduction in magnetics and capacitance and the resultant gain in real estate and power efficiencies provide an opportunity to add additional circuitry to monitor and control LED light fixtures.

Large bulk capacitors at the heart of a power supply typically have limited life span (measured in thousands of hours), and greatly degrade at elevated operating temperatures. This is due to chemical changes in the electrolytic fluids of the power supply that degrades their ability to hold charge with time and heat. Due to faster switching ability of GaN FETs, smaller capacitance ceramic caps can be used with lifetimes rated in millions of hours, with greatly improved mechanical and thermal characteristics.

GaN technology lends itself to smaller die area, larger VDS voltage isolation and faster switching, all characteristics that greatly reduce real estate and device cost while increasing the longevity of the device. Efficiency gains and the resultant reduction in heat and wasted power gives other required components a much longer life.

Thus what is needed is a smart microcontroller capable of maximizing the switching parameters and system operations to maximize the capability of GaN technology in lighting and network control applications.

SUMMARY OF THE DISCLOSURE

The purpose of the Summary is to enable the public, and especially the scientists, engineers, and practitioners in the art who are not familiar with patent or legal terms or phraseology, to determine quickly from a cursory inspection, the nature and essence of the technical disclosure of the application. The Summary is neither intended to define the inventive concept(s) of the application, which is measured by the claims, nor is it intended to be limiting as to the scope of the inventive concept(s) in any way.

In a preferred embodiment the disclosed microcontroller is configured to monitor the input voltage and load conditions, and continuously adjust the switching frequencies in order to optimize the efficiency and longevity of the power supply. The microcontroller utilizes a combination of GaN switching elements with their efficient high frequency switching capabilities, together with the continuous monitoring of the load conditions, allowing the intelligent microcontroller to vary the switching frequency of the power conversion blocks as needed in order to maintain the highest efficiency of conversion.

The monitoring of the load described herein is not the typical feedback loop employed to control the output voltage as in Constant Current (CV), or Constant Current (CC) applications, but rather circuitry that dynamically tunes the switching frequency at which the power conversion circuitry is most efficient.

Such efficiency calculations are performed ahead of time in theoretical calculations and simulations and are later verified in real hardware to ensure the optimum operating conditions. This is accomplished via configuring the controller with programmed operating parameter tables for the various implementations of the power supplies.

The wide range of switching frequencies afforded by the GaN switching technologies combined with intelligent control, allows the intelligent GaN converter to cover wider spans of power delivery requirements, thus using fewer SKUs (stock keeping unit) for power supplies. For example an adequate coverage of the LED power supply product range might require 3-4 different SKUs to cover ranges from 30-300 W as power conversion efficiency is greatly dependent on load conditions, and with fixed switching frequencies the typical power supply operating parameters are set and do not change. The ability of intelligent control to change operating parameters with varying input voltage and load conditions, allows for example two SKUs to cover the full range of 30-300 W power conversion while ensuring the maximum efficiency. This reduction in SKUs reduces the number of SKUs required to cover the full range of power conversion. This reduces the number of SKUs required to be manufactured to cover the power conversion range and reduces the number of SKUs an installer must carry to cover possible power input situations.

Various monitoring of the temperatures in the power supply, in particular the critical switching circuits, ensures that efficiency and device longevity is maintained by further adjustment of the power conversion circuits operating parameters.

Preferably the intelligent control comprises a microcontroller that is configured to monitor the environmental conditions and such monitoring will allow trading off small operating efficiency for greatly improving longevity of the power conversion components in the event that environmental conditions change dramatically.

In addition, the microcontroller allows other communication technologies to be integrated in the power supply to enhance communication between devices such as LED lights that employ such a power supply and other devices or software applications.

In a preferred embodiment the microcontroller of a device such as a light fixture is configured to connect to one or more other devices having a microcontroller or other controller configured to connect to the GaN power supply or device, and to an external network, such as the Internet. Such an embodiment may be referred to as a GaN Smart Driver. The microcontroller is configured to be programmed and/or controlled by an Internet of Things (TOT) controller, such as a web-based app. The microcontroller is configured to provide direct digital control of the power supply that is supplied to a light or other device. In a preferred embodiment the microcontroller is preferably configured to monitor the LED load provided to a light. The microcontroller is configured to dynamically adjust the power to a light based on one or more factors including, but not limited to, environmental factors such as ambient light, temperature, presence of persons, animals or other subjects in the intended lighting area, and non-environmental factors such as preset lighting parameters, energy grid instructions, IoT signals and factors of the lighting apparatus itself including temperature of the microcontroller, temperature of the lighting element, a health of the luminaire.

The idea of precise control and reporting is also extended with the use of a wireless communication technology in a Mesh configuration (such as that described in U.S. Pat. No. 8,777,453) allowing direct control of the GaN Smart Driver in a grid of installed devices, to communicate messages from each device back to a central station controller giving the facility operator the ability to monitor, control and pinpoint equipment failures electronically rather than through human inspection. The mesh networking of these GaN Smart Drivers installed in LED light fixtures allows communication to each other and to a central HUB. Communication can be via several wired and wireless technologies.

The ability to have a lighting fixture report its status and operating parameters greatly reduces the maintenance cost of the facility by removing the human monitoring expense from the system. Further costs related to intelligent switching on/off or dimming of lighting equipment to allow for seasonal changes from a central location, will further reduce the operating cost of the LED lights.

Intelligent microprocessor controls of such lighting installations also extends to power savings realized by being able to completely turn off the power supply until needed, and even though newer power supplies have driven down the quiescent power consumption to reasonably low levels, this design can reduce such consumption to virtually zero power.

Intelligent control of the power supply and its ability to communicate in a mesh network configuration will allow each luminaire or other device to be able to configure into a network without the need to add an external communication device(s) or configure addressing for each GaN Smart Driver. An installer can install all necessary lighting devices, then using a mobile or Cloud based application be able to "discover" all devices on the network, and select their functional mapping based on installation requirements, for example (but not limited to) when installing front entry lights, perimeter lights, or lights on certain floors of a parking garage.

The addition of intelligent control also enables a number of other applications built into the GaN Smart Driver. The Cloud based application, can also take into account other sensors such as infra-red (IR) occupancy or perimeter beam intrusion detection, to inform the system of what lighting devices to turn on/off in order to reduce power consumption and improve usability. Sensors to monitor the environment such as humidity, temperature, carbon dioxide levels, and other environmental conditions can be additional elements of the GaN Smart Driver making its use attractive in hazardous locations. Video camera capability further enhances security and the mesh connected GaN Smart Drivers allow movement of video data between devices over long distances in large installations.

Providing the capability to remotely adjust the output power of the power supply will allow large installation projects to save money by not providing as much light when conditions do not require it. This will work similar to typical light dimmers but without the resistive element losses associated with such dimmer control.

The GaN Smart Driver is configured to be individually addressable and controllable through mesh networks such as Thread or Bluetooth Low Energy (BLE), which are self-organizing typically due to proximity, unique IDs, capabilities, and assigned ownership, a large installation can be very easily put together by installing the light fixtures, verifying each light fixture is powered up correctly and is ready for commissioning.

A HUB or Gateway device that provides data connectivity from the mesh network, such as from Thread or BLE to WiFi or wired Ethernet link will enable a connection of a cluster of GaN Smart Drivers to be connected to a proprietary LAN based app. A Gateway router connected to the GaN Smart Driver and/or directly to the mesh network can connect to the outside Internet or other network. For example, the router can utilize the cellular network and a user connected to the Internet from anywhere in the world using a Cloud based app can set up and commission, and monitor or control the devices connected to the mesh network. Alternatively, or in addition thereto, the router can connect to a variety of non-Internet networks, such as one using BACnet to implement building automation.

Graphics based commissioning application will allow the owner of the installation to view all available devices and map them into a site map.

Once mapped the installation owner can view a panel of control parameters for each particular light fixture, give it a unique name or installation identifier, and establish control schedules based on time events of external sensor inputs.

Time event control schedules can specify ON/OFF timing, adjustments due to seasonal changes in light conditions, and other time-based operational schedules.

Event based schedules, configured by the microcontroller with provided motion, temperature, vibration, light sensing, and/or other environment sensors, which when tied into the same network through, direct connection, IoT connection or cloud connection, can be used to trigger different activity for the lighting installation.

For example, a presence detect circuit can temporarily turn on perimeter lighting at a facility, or entire floors or sections of a parking garage can be lit up when activity is detected.

Additionally, health monitoring available in each light fixture, will update the Operations screen almost instantaneously if the light fixture is down (drawing no power), or if other events to the Power Grid occurred, such as frequent power spikes, detrimental to equipment, temporary loss of line power or great variation of temperatures which have to do with equipment reliability.

The microcontroller's capability to read the internal temperature and/or ability to read the numbers of hours in operation thereby gauging life expectancy of need of PM for a light fixture could provide the Installation owner knowledge on the integrity of the system, and its components. The microcontroller's ability to calculate energy usage per light fixture and aging parameters such as actual hours of operation, can provide valuable information that helps extend the life of the installation and allows preventive maintenance of fixtures.

Typically the mesh network is powered by the standard power grid. In a further preferred embodiment a plurality of GaN Smart Driver powered and controlled devices is provided in a mesh network. Some, and preferably all, of the devices further include a battery or alternate energy storage device (collectively referred herein as a battery) that is configured to power each microcontroller and connected IoT device (such as sensors) in the event of a power outage. Preferably the battery is rechargeable such that when power is available through a local grid or other power source, the devices are configured for charging the battery and subsequently maintaining the battery in a charged state. Providing a battery will allow the mesh network to continue to operate as a battery-driven mesh network, preserving a functional control grid even in the event of a general power failure. Preferably, in these embodiments, the border routers or other gateways that provide wifi access points to the drivers and IoT devices are powered by an alternate power source, as typically wifi and router access points require more energy that a GaN Smart Driver mesh network control and IoT associated device. An example scenario would be a mesh network utilized in a building to control the lights, monitor and managing sensors and controls throughout the building, and can continue the control of the remaining systems in the building, including systems with independent power backup. The drivers and IoT devices can further be programmed to operate in scenario specific settings or manually configured through the mesh network to operate in different settings in the event of a power outage requiring the devices to operate on battery power.

For example, a further beneficial scenario would be if the wiring for the light fixtures is always powered on, and control of the lights is by the mesh network microcontrollers embedded in the GaN Smart Drivers, then the battery is used only when there is a power outage. If the power to the light fixtures is controlled by a wall switch, or can otherwise be turned off completely, then the battery would be used overnight, over a weekend, or whenever the power to the lights is turned off to maintain the operation and monitoring of IoT devices in the mesh network.

While certain exemplary embodiments are shown in the Figures and described in this disclosure, it is to be distinctly understood that the presently disclosed inventive concept(s) is not limited thereto but may be variously embodied to practice within the scope of this disclosure. From the foregoing description, it will be apparent that various changes may be made without departing from the spirit and scope of the disclosure as defined herein.

Still other features and advantages of the presently disclosed and claimed inventive concept(s) will become readily apparent to those skilled in this art from the following detailed description describing preferred embodiments of the inventive concept(s), simply by way of illustration of the best mode contemplated by carrying out the inventive concept(s). As will be realized, the inventive concept(s) is capable of modification in various obvious respects all without departing from the inventive concept(s). Accordingly, the drawings and description of the preferred embodiments are to be regarded as illustrative in nature, and not as restrictive in nature

BRIEF DESCRIPTION OF THE DRAWINGS

FIG. 3 illustrates a BT-LE mesh network with End of Line HUB access to provide Cloud control of one or more microcontroller controlled smart devices.

DETAILED DESCRIPTION OF THE PREFERRED EMBODIMENTS

Figure 1:
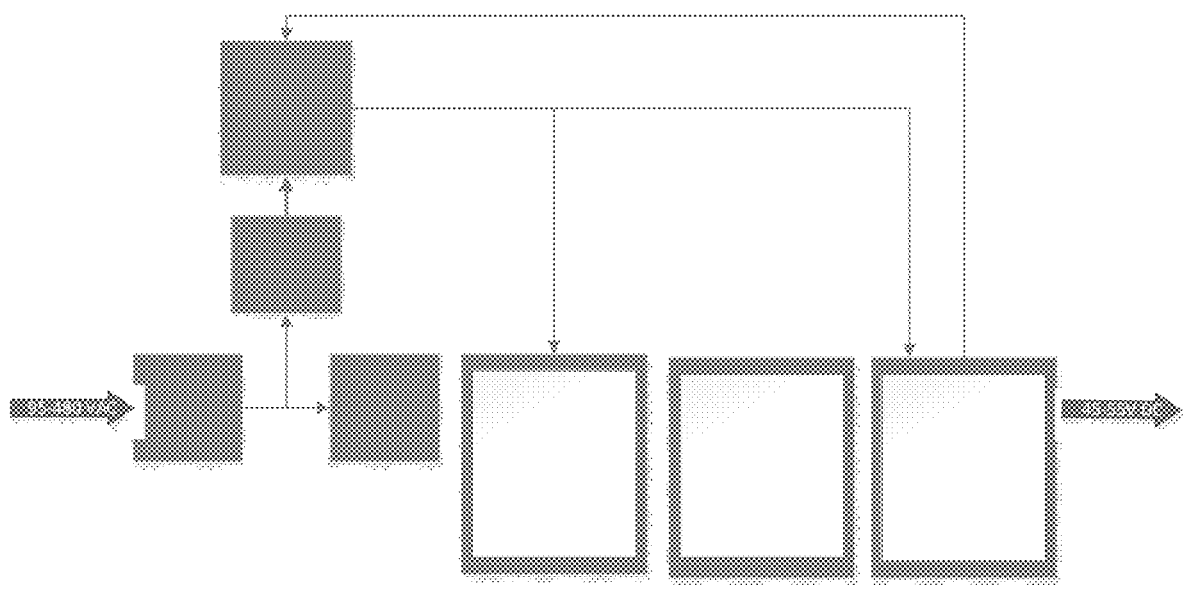
FIG. 1 illustrates a typical smart AC/DC power conversion and control design for powering a light fixture or other device.

While the presently disclosed inventive concept(s) is susceptible of various modifications and alternative constructions, certain illustrated embodiments thereof have been shown in the drawings and will be described below in detail. It should be understood, however, that there is no intention to limit the inventive concept(s) to the specific form disclosed, but, on the contrary, the presently disclosed and claimed inventive concept(s) is to cover all modifications, alternative constructions, and equivalents falling within the spirit and scope of the inventive concept(s) as defined in the claims.

FIG. 1 illustrates a block diagram of a typical AC/DC Power Conversion design containing typical elements including, but not limited to, an Interleaved Boost PFC (Power Factor Correction) stage, a Half Bridge LLC resonant stage and a SR DC voltage output circuit.

Figure 2:
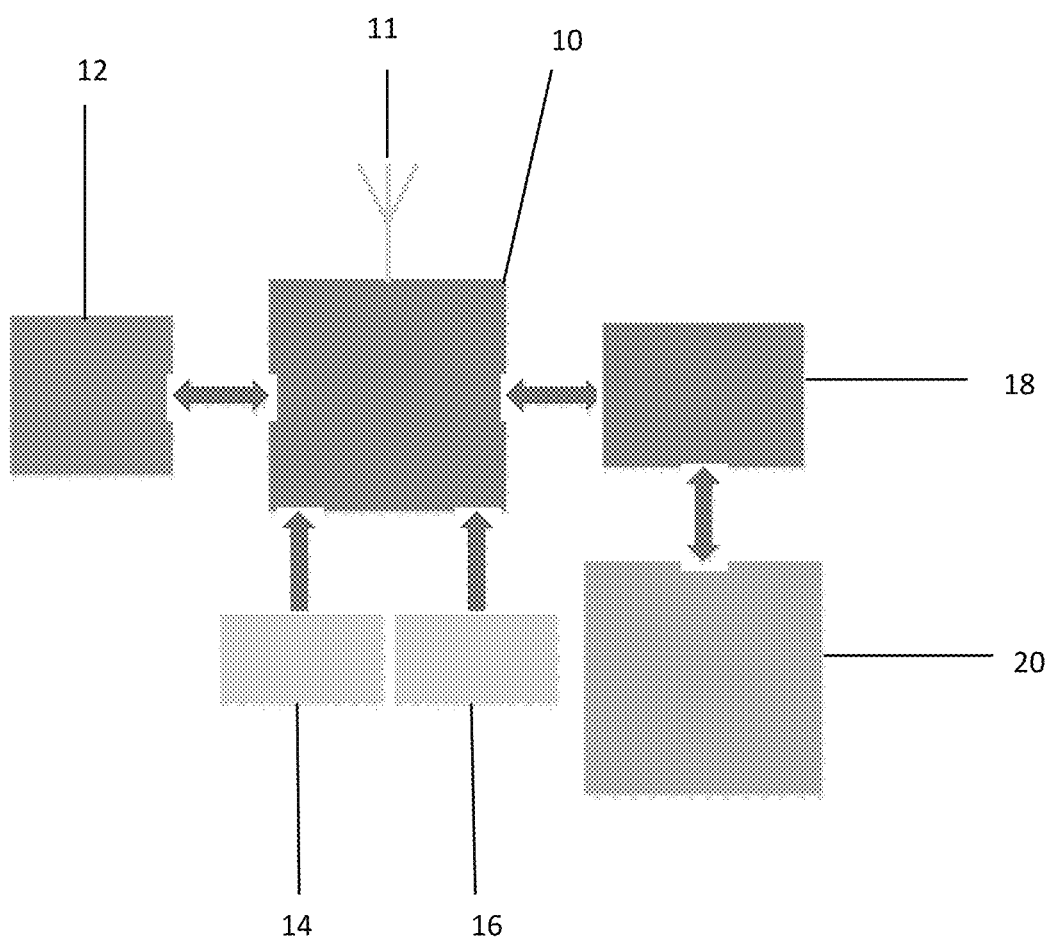
FIG. 2 illustrates a control block diagram of a GaN Smart Driver for controlling and powering a light fixture or other device.

FIG. 2 illustrates a control block diagram of a preferred embodiment of a GaN Smart Driver integral with a luminaire. The GaN Smart Driver utilizes a controller 10 configured with a connection 11 to a mesh network and/or gateway to the Internet or other network (referred herein as an external network, meaning an external network from the mesh network). The controller is shown connected to internal sensors 14 configured for sensing conditions within the luminaire as well as an external sensor 16 in the form of a camera. The camera and controller can be configured, for example, such that when the camera detects motion in an area, the controller turns the luminaire on, off, and/or alters lumen output of the luminaire. The controller has an external digital interface accessed via the Internet such as via a Cloud application and/or via a device connected to the mesh network, such as a tablet, smartphone, or other computer device. The controller controls power to the light of the luminaire via analog feedback and control circuits 18 that control power supplied to the power supply (PS) conversion circuits. The power supply conversion circuits convert AC power to DC power to power the operational aspect of the device, such as an LED. The device can be provided with a energy storage device, such as a battery, configured to power the controller and sensor(s) to continue operation of the control grid in the event of a power outage, and allowing for continued access to and operation of the device via the Internet or other network. While in the depicted embodiment the controller is configured to control a luminaire, other IoT devices can be controlled, including but not limited to sensors, alarms, energy grid controls, luminaires, and building environmental control devices.

FIG. 3 illustrates a plurality of devices labeled (OCI Intelligent PSx) 30 connected to a mesh network. Each device is configured with a connection, such as a wireless connection 34, 32 that connects to each of the other devices and/or to a connection to connect to the Internet or other network. In the depicted embodiment of FIG. 3 the connection to the Internet or other network is depicted as the End of Line Hub 36. The End of Line Hub has a connection 38 for connecting to one or more of the smart devices 30 of the mesh network. The End of Line Hub provides for control of the devices in the mesh network via a cloud connected application 40 accessed by a computer 42 or other device connected to the cloud application.

While certain preferred embodiments are shown in the figures and described in this disclosure, it is to be distinctly understood that the presently disclosed inventive concept(s) is not limited thereto but may be variously embodied to practice within the scope of the following claims. From the foregoing description, it will be apparent that various changes may be made without departing from the spirit and scope of the disclosure as defined by the following claims.

What is claimed is:

1. A smart driver configured for the control of an LED luminaire, said smart driver comprising:
    an AC input;
    at least one Gallium Nitride field effect transistor configured to efficiently convert an AC power input to DC power output;
    a controller, wherein said controller is configured to efficiently and dynamically control the Gallium Nitride field effect transistor to optimize to different conditions concerning at least one condition from the group consisting of environmental conditions, internal conditions of said luminaire, and external control signals;
    a wireless or wired communication device configured to connect said controller of the smart driver to at least one other microcontroller in a mesh network and to an external network; an input configured to provide a signal to said controller concerning the at least condition selected from the group consisting of environmental conditions, internal conditions of said luminaire, and external control signals;
    a DC power output, wherein said controller is configured to dynamically digitally regulate the output of said DC power output by efficiently and dynamically controlling the Gallium Nitride field effect transistor based on said signal received from said input; and an LED light configured to be powered by said DC power output.

2. The smart driver of claim 1, further comprising an energy storage device configured to power said microcontroller in the event of a power outage.

3. The smart driver of claim 2, wherein said energy storage device comprises a rechargeable battery.

4. The smart driver of claim 1 further comprising at least one sensor, wherein said sensor is configured to sense at least one environmental condition.

5. The smart driver of claim 1, wherein said environmental conditions are selected from the group consisting of ambient light, temperature, presence of persons, animals or other subject in a lighting area.

6. The smart driver of claim 1, wherein said external control signal comprises a signal selected from the group consisting of preset lighting parameters, energy grid instructions, and Internet of Things signals.

7. The smart driver of claim 1, wherein said signal concerning internal conditions of the luminaire is selected from the group of signals consisting of a signal regarding the temperature of the microcontroller, a signal regarding the temperature of the lighting element, and a signal regarding the health of the luminaire.

8. A mesh network of IoT connected devices comprising:
    a plurality of IoT devices connected by wireless or wired communication in a mesh network;
    at least smart driver configured to control at least one of said IoT devices, wherein said smart driver comprises the following:
    an AC input;
    at least one Gallium Nitride field effect transistor configured to efficiently convert an AC power input to DC power output;
    a controller, wherein said controller is configured to efficiently and dynamically control the Gallium Nitride field effect transistor to optimize to different conditions concerning at least one condition from the group consisting of environmental conditions, internal conditions of said luminaire, and external control signals;
    a wireless or wired communication device configured to connect said controller of the smart driver to at least one other microcontroller of a second IoT device in the mesh network and to an external network;
    an input configured to provide a signal to said controller concerning the at least condition selected from the group consisting of environmental conditions, internal conditions of said luminaire, and external control signals;
    a DC power output, wherein said controller is configured to dynamically digitally regulate the output of said DC power output by efficiently and dynamically controlling the Gallium Nitride field effect transistor based on said signal received from said input; and
    a gateway for connecting to the Internet or other non-Internet network; and
    wherein said controller is configured to control said second IoT device in response to communication received through said gateway from the Internet or other non-Internet network.

9. The mesh network of claim 8, wherein said smart driver controller further comprising an energy storage device configured to power said microcontroller in the event of a power outage.

10. The mesh network of claim 9, wherein said energy storage device comprises a rechargeable battery.

11. The mesh network of claim 8, wherein said gateway comprises a router.

12. The mesh network of claim 8, wherein said gateway is integral with said controller of said smart driver.

13. The mesh network of claim 8, wherein said plurality of IoT devices are selected from the group consisting of sensors, alarms, energy grid controls, luminaires, and building environmental control devices.

* * * * *